Figure 7:
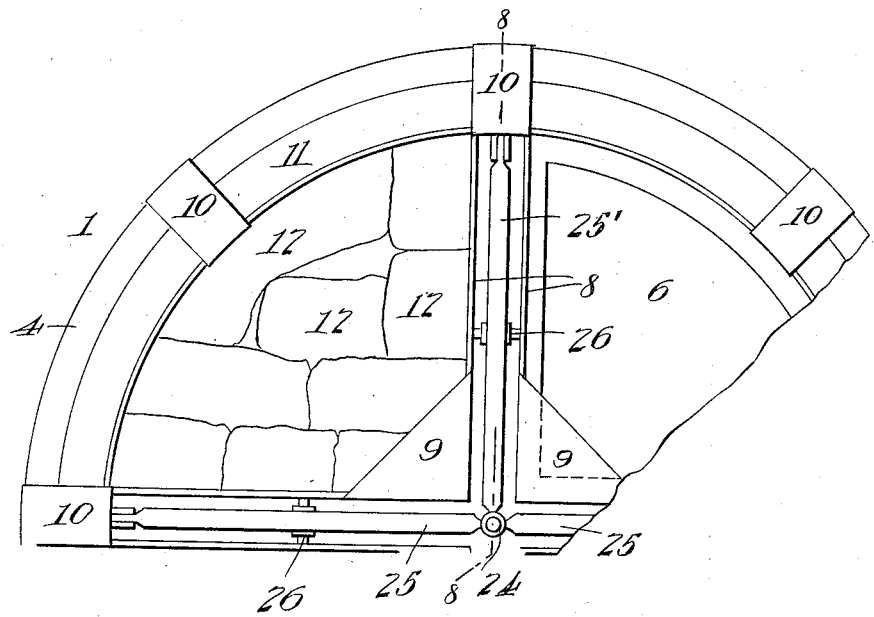

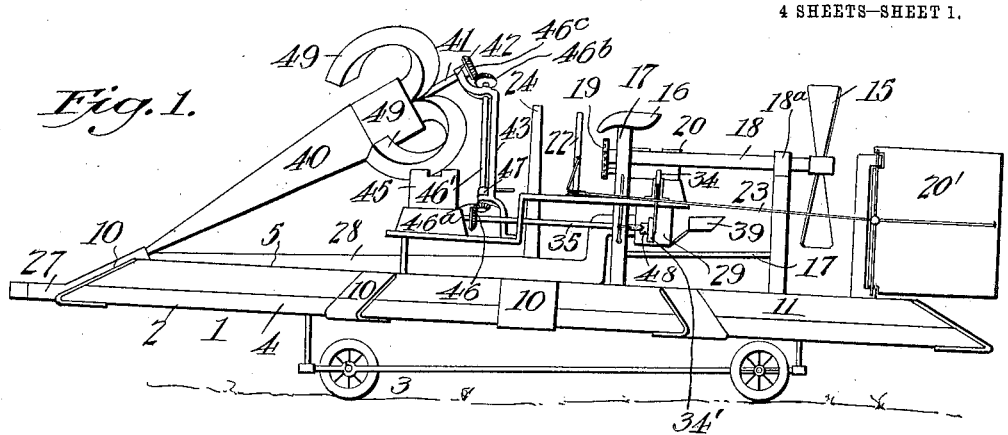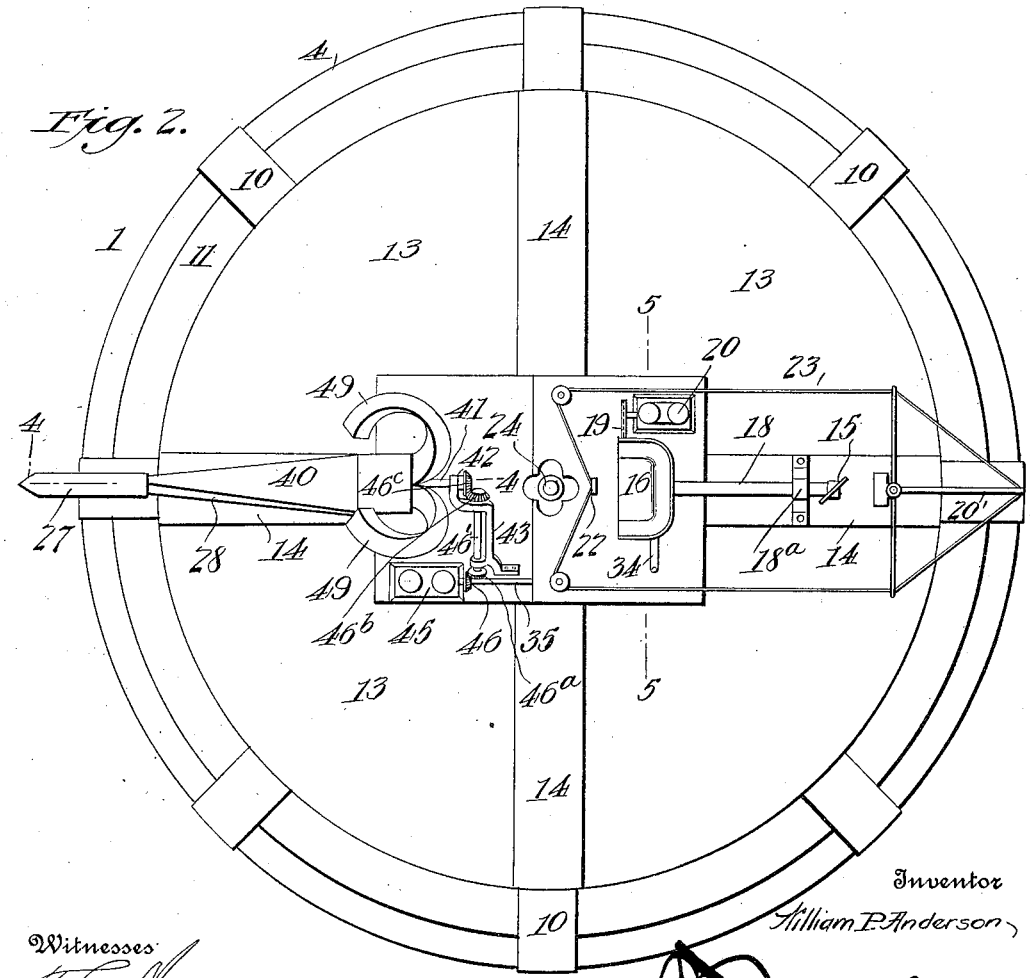

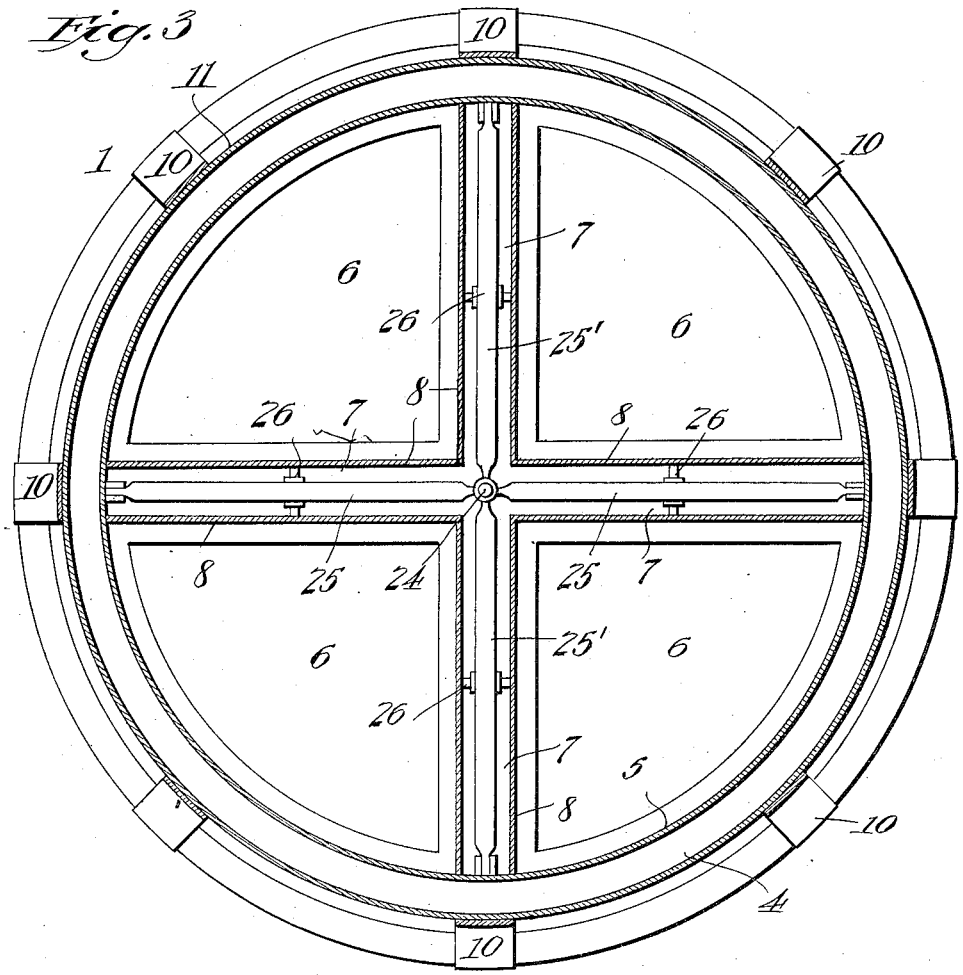
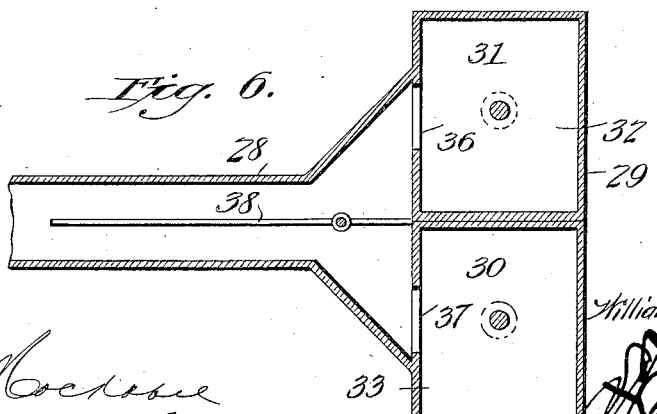

W. P. ANDERSON.
FLYING MACHINE.
APPLICATION FILED JULY 3, 1913.
1,092,000.
Patented Mar. 31, 1914.
4 SHEETS—SHEET 3.
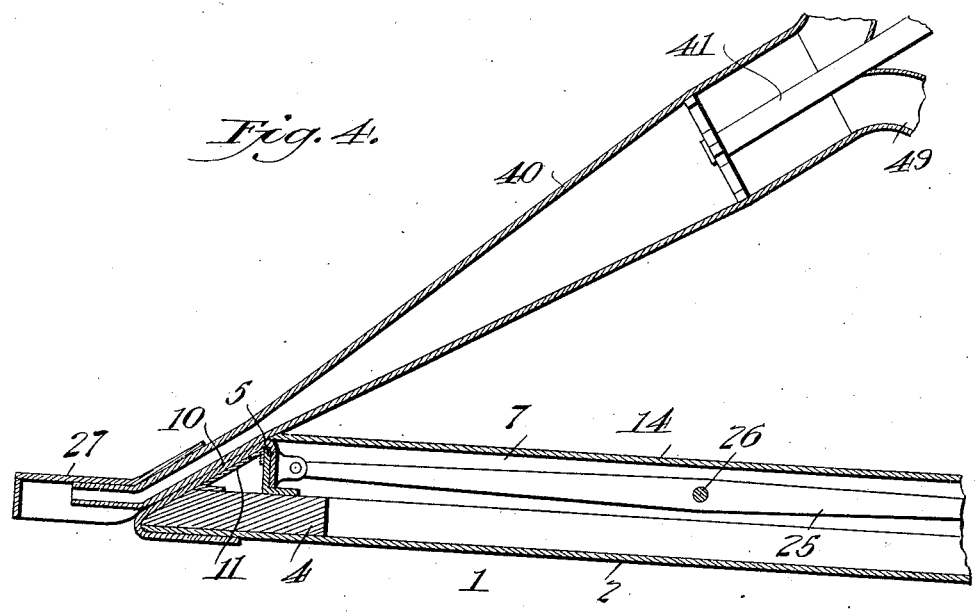
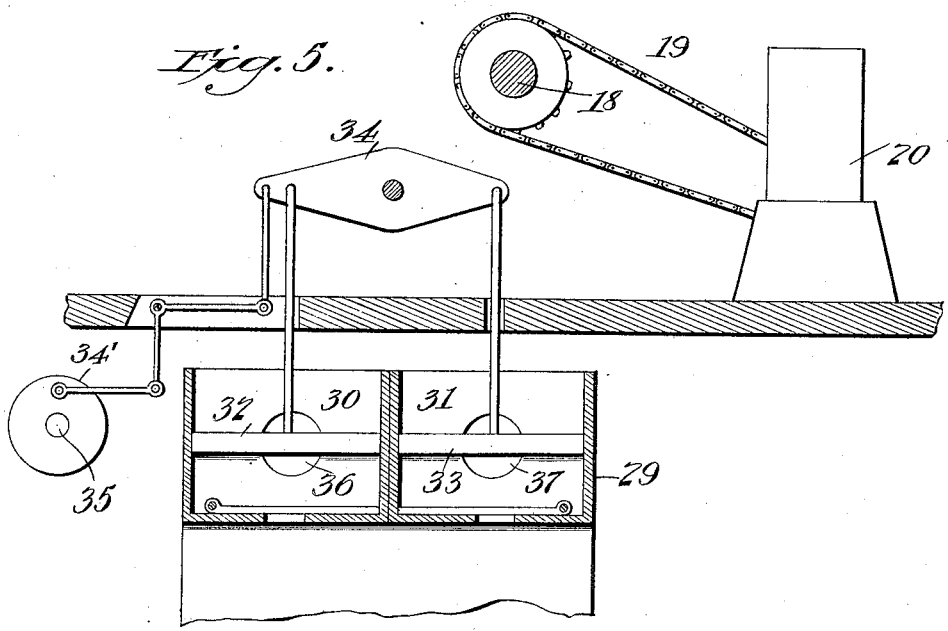
Witnesses
Inventor
William P. Anderson
Attorney

W. P. ANDERSON.
FLYING MACHINE.
APPLICATION FILED JULY 3, 1913.

1,092,000.

Patented Mar. 31, 1914.
4 SHEETS—SHEET 4.

Witnesses

Inventor
William P. Anderson,
By Attorney

UNITED STATES PATENT OFFICE.

WILLIAM P. ANDERSON, OF OAKLAND, CALIFORNIA, ASSIGNOR OF ONE-FOURTH TO PETER J. KOLICH, OF OAKLAND, CALIFORNIA.

FLYING-MACHINE.

1,092,000.  Specification of Letters Patent.  Patented Mar. 31, 1914.

Application filed July 3, 1913.  Serial No. 777,276.

*To all whom it may concern:*

Be it known that I, WILLIAM P. ANDERSON, a citizen of the United States, residing at Oakland, in the county of Alameda and State of California, have invented certain new and useful Improvements in Flying-Machines; and I do hereby declare the following to be a full, clear, and exact description of the invention, such as will enable others skilled in the art to which it appertains to make and use the same.

This invention relates to improvements in flying machines of the aero-dynamic type, contemplating the provision of a flying machine having a supporting surface of novel construction, designed to embody in a unitary structure the sustaining effects of an aerostat and aeroplane, whereby maximum lifting and supporting power may be obtained.

The primary object of the invention is to provide a flying machine embodying a supporting surface of the character defined, and including in its construction a surface for the dynamic re-action of the air thereon and a plurality of gas chambers or compartments to receive hydrogen or other gas lighter than air, such supporting surface being adapted to be warped or flexed whereby the machine may be readily and efficiently steered in a vertical plane and its lateral and longitudinal balance maintained.

A further object of the invention is to provide a structure of the character set forth wherein provision is made for ready access to the gas chambers for convenience in repairing and renewing parts when occasion requires, and for the inclosure within the body of the supporting surface of simple and effective means, under the control of the air-man, whereby the surface may be warped or flexed for the purposes described.

A still further object of the invention is to provide means whereby compressed air may be supplied beneath the undersurface of the combined aerostat and aeroplane for the purpose of giving added lifting force in launching the machine or causing its ascension to different elevations or for overcoming any deficiencies in the lifting pressure which may exist at any time when the machine is in flight, due to variations in the density in the atmosphere or other causes.

A still further object of the invention is to provide compressed air supplying devices which may be operated independently or in unison, to provide propelling mechanism which may be adjusted to steer the machine laterally in either direction, and to provide a flying machine which as a whole is simple of construction and reduces the number of parts giving head resistance.

With these and other objects in view, the invention consists of the features of construction, combination and arrangement of parts hereinafter fully described and claimed, reference being had to the accompanying drawings, in which:—

Figure 8:
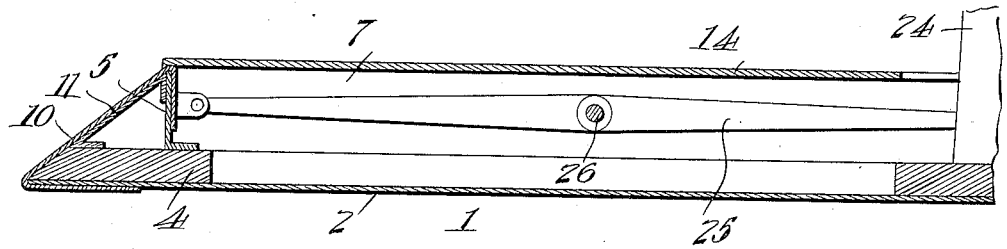

Figure 1 is a side elevation of a flying machine constructed in accordance with the invention; Fig. 2 is a top plan view of the same; Fig. 3 is a sectional plan view through the supporting surface; Figs. 4 and 5 are, respectively, vertical longitudinal and vertical transverse sections on the lines 4—4 and 5—5 of Fig. 2; Fig. 6 is a sectional plan view through the wind box and conductor of the air compressor; Fig. 7 is a fragmentary top plan view of the supporting surface, showing the covers of the compartments removed; and Fig. 8 is an enlarged detail section on line 8—8 of Fig. 7.

In the practical embodiment of my invention, I provide a flying machine having a supporting surface 1, preferably of circular form, and consisting generally of a disk-shaped body, designed to present as little obstructing area to flight as possible, in order to diminish head resistance and enable great lifting power and speed to be obtained. This surface is intended in practice to fly at a desired angle of incidence, for the dynamic re-action of the air upon its bottom or re-action face 2. In practice, the machine may be provided with any suitable type and arrangement of launching and landing wheels 3, so disposed as to support the machine at a desired elevation above the ground, in order that currents of air from the compressor or rotary pump hereinafter described may be supplied below the surface 2 to assist in raising the machine into the air.

The surface 2 consists of a bottom wall 4, around the upper face of which extends a rim 5. At a little distance inwardly from its periphery, the space bounded by the rim 5 is quartered or divided into four segmental or sector-shaped chambers or compartments 6 and intervening longitudinal and transverse channels 7 by a series of radial division walls 8. The adjacent inner ends of the walls 8 forming each compartment 6 are connected at their inner ends and reinforced by triangular stays 9, while the rim or annular wall 5 is reinforced from the periphery of the bottom wall 4 by stays 10, the materials employed being of a resilient or flexible type and their arrangement such as to produce a body 1, which, while strong and durable in construction, is capable of being warped or flexed upon itself, for a purpose hereinafter described.

The peripheral portion of the surface 1 between the peripheral edge of the wall 2 and the rim 5 is provided with an envelop or covering 11 of some suitable material, such as balloon silk or a rubberized fabric, so as to produce an outer gas containing chamber having a certain lifting efficiency. This gas containing chamber is designed to coöperate with gas bags or flexible gas containing chambers 12, disposed within the compartment 6, to provide an aerostatic body, in which a suitable number of gas storage reservoirs of proper capacities are held to support the whole or a greater part of the weight of the machine, thereby giving greater dirigibility and necessitating the use of a comparatively small amount of driving power to sustain the machine in flight or to drive it at high speed through the atmosphere. The compartments 6 and channels 7 are preferably provided with removable covers 13 and 14, of fabric, sheet metal or other suitable material, designed to afford a certain degree of protection to the fabric of the gas containers, while not inhibiting warping or flexion of the supporting surfaces to an undesirable degree. Of course, it will be understood that the top and bottom walls of the compartments 6 may be formed by corresponding walls of the gas receptacles, and that when it is desired to protect such receptacles from damage by bullets or other flying missiles, suitable armor upon the face 2 may be used.

For the purpose of propelling the machine through the air, I provide a propeller 15, preferably located at a point in rear of the aviator's seat 16, which is mounted upon a bracket or upright 17 rising from the frame structure. The said propeller 15 may be of any proper thrust power and is mounted upon a shaft 18 journaled in bearings 18$^a$ carried by the bracket 17, said shaft being driven by sprocket gearing 19 from a suitable motor 20. A rudder 20' is also suitably supported from the surface 1 and is adjustable to steer the machine laterally in either direction by means of a controlling device 22 connected therewith by cords or wires 23.

For the purpose of warping or flexing the body 1 to balance the machine laterally and longitudinally, as well as to steer it in a vertical plane, I provide a universally movable lever 24 pivotally coupled at its lower end to the inner ends of a series of radial lever arms 25 and 25', extending longitudinally and transversely of the machine within the respective channels 7. The levers are intermediately fulcrumed, as at 26, to the walls of the channels, and are pivotally coupled at their outer ends to the rim 5, so as to be capable of bending or flexing the rim and warping prescribed adjacent portions of the body 1. It will be apparent from the foregoing construction that the lever may be rocked in either direction longitudinally, to simultaneously warp or bend portions of the body 1 in opposite directions, in front and rear of its transverse axis, to steer the machine vertically or balance it longitudinally, and that said lever may also be rocked laterally in either direction to bend or warp opposite portions of the body 1 on opposite sides of its longitudinal axis in opposite directions, to balance the machine laterally, and as well as to assist in guiding it in a horizontal plane and banking it in making turns, etc.

I provide suitable means for supplying compressed air beneath the body 1 for action upon the surface 2, to give an added lifting effect. This means preferably comprises a discharge nozzle 27, extending forwardly in the form of a prow, with which nozzle communicates a conductor 28, communicating at its rear end with a wind box 29. The wind box is provided with separate compartments or pump chambers 30 and 31, in which operate reciprocatory compression pistons 32 and 33, alternately driven on their suction and compression strokes by a walking beam 34 operated by crank or eccentric mechanism 34' from a shaft 35. The conductor 28 is in communication with the respective pump chambers through ports 36 and 37, and has arranged therein an automatic, pivoted, laterally-movable deflector 38 adapted as each pump delivers a charge of air to the tube, to open under the pressure of the air for connecting the associated port with the tube and simultaneously closing communication between the tube and the port leading to the opposite pump chamber, thereby enabling the pumps to be operated in an efficient manner without interference and to discharge into a single conductor. A seat 39 may be mounted upon the wind box for the convenience of the engineer or person in charge of the pump equipment. It will thus be understood that a double-acting pumping mechanism is provided by which compressed air may be forced under the surface 1 at the start of flight to facilitate the launching of the machine into the air, or while the machine is in flight to augment the amount of air brought into contact with the surface 2 for compression, thereby giving greater lifting power and enabling the machine to be launched from the ground to any desired elevation or preliminarily lifted so that the propeller may be set into action to drive the machine ahead.

A second compressor may be provided, for operation by power from the same motor which drives the double-acting compressor or for action under the pressure of the wind when the machine is in flight to also supply air to the nozzle 27. This second compressor comprises a conical or funnel-shaped body 40, forming a conductor, supported by a shaft 41 and communicating at its forward end with the nozzle. The conductor 40 and shaft 41 extend in an inclined plane, projecting at a downward and forward angle to the nozzle from a point in advance of the transverse center of the body 1. The shaft is suitably journaled at its forward end, and at its rear end is journaled in a bearing 42 carried by a bracket 43 mounted upon the frame structure. A motor 45 is suitably mounted on the body 1 and in direct driving connection with the shaft 35, on which a gear 46 meshing with a gear 46ª on a shaft 46′ journaled in the bracket 43 and carrying a gear 46ᵇ meshing with a gear 46ᶜ on the shaft 41, clutch devices 47 and 48 being provided whereby the gear 46′ and eccentric 34′ may be connected with or disconnected from their shafts, so that either or both air compressing devices may be thrown into or out of operation at will. The rotary conical conductor 40 is provided with an annular series of scroll-shaped flues or hollow propelling and conducting arms 49, which are adapted in the rotation of the device to take up and compress air and force the same under pressure to the discharge nozzle for use. The revolving compressor may be allowed to run free when the machine is being operated at high speed in flight, or being driven against a strong wind so that the pressure of the air on the flukes will set said compressor into action for the supply of air to the nozzle. In practice, the rotary compressor is preferably employed when the machine is in flight while the double-acting compressor is employed when the machine is at rest and during the instant of launching, but either compressor may be employed at any time, or both set into operation in unison when it is desired to augment to a considerable extent the volume of air supplied to the surface 2 for compression.

In constructing the machine, the disk shaped plane is of such great spread as to counteract the effect of having the mechanism mounted above the disk shaped body thus providing an approximately low center of gravity and insuring the proper stability of the machine.

From the foregoing description, taken in connection with the drawings, the construction and mode of operation of my improved flying machine will be readily understood, and it will be seen that the invention provides a machine which embraces the supporting qualities of both an aeroplane and an aerostat, and in which a frame structure having material resistance is eliminated, and that means are provided for warping or flexing the supporting surface as a whole, and for supplying compressed air to secure an increased lifting effect, whereby substantial and important advantages are obtained.

While the structure disclosed is preferred, it will, of course, be understood that modifications in the structure falling within the scope of the appended claims may be resorted to without departing from the spirit of the invention or sacrificing any of the advantages thereof.

Having thus described my invention, what I claim is:—

1. A flying machine including a disk-like flexible aeroplane body, having gas compartments therein, means for flexing said body, said body having a reaction surface, means for discharging air against the reaction surface and a rotary pump for supplying air to the discharging means.

2. A flying machine including a disk-like body forming an aeroplane inclosing a series of gas compartments, and means for warping said body, said means comprising a universally movable lever, and a plurality of radial arms connected with the lever and body and being pivoted intermediate their ends.

3. A flying machine including a disk-like body forming a combined aeroplane and aerostat, said body comprising a frame-structure having a re-action surface and a series of gas compartments, gas receptacles in said compartments, a nozzle arranged to discharge air against the reaction surface and means for supplying air to the nozzle.

4. A flying machine including a combined aeroplane and aerostat, comprising a disk-shaped body formed of a flexible frame having a gas compartment having a reaction surface and a series of gas compartments and means for warping said frame, said means comprising a universally movable lever and a plurality of radial arms connecting the lever with the body.

5. A flying machine including a combined aeroplane and aerostat comprising a disk-shaped body formed of a flexible frame, means for flexing said body, comprising a universally movable lever arranged centrally of the disk shaped body, and a plurality of radial arms pivoted intermediate their ends and connected with the universal lever and disk shaped body.

6. A flying machine including a combined aeroplane and aerostat comprising a disk-shaped body formed of a flexible frame having a series of radial compartments, gas reservoirs stored therein, a gas chamber around the periphery of said frame, and means for warping said body.

7. A flying machine including a combined aeroplane and aerostat comprising a flexible frame having a group of gas compartments and intermediate longitudinal and transverse channels, gas bags within the said compartments, warping devices arranged in the channels, and a universally-movable element for operating said warping devices.

8. A flying machine including a supporting surface, a nozzle arranged to project air against the re-action face of said surface, and a rotary pump for supplying air to the nozzle, said pump comprising a revoluble conductor and scroll-shaped flukes or arms carried thereby.

9. A flying machine including a supporting surface, a nozzle arranged to discharge air against the re-action face of said surface, a conductor communicating with the nozzle, a double-acting pump having ports communicating with said conductor, means for driving said pump, a deflector controlling communication between the conductor and the respective ports, a rotary pump communicating with the nozzle and comprising a removable conductor and scroll-shaped flukes carried thereby.

10. A flying machine including a combined aeroplane and aerostat comprising a flexible disk-shaped body having a re-action surface, and a plurality of gas compartments, gas reservoirs within said compartments, means for warping said body, and means for producing a current of compressed air and discharging the same against said re-action surface.

In testimony whereof I affix my signature in presence of two witnesses.

WILLIAM P. ANDERSON.

Witnesses:
 HARRY LUCKENBACH,
 J. B. WILSON.

---

Copies of this patent may be obtained for five cents each, by addressing the "Commissioner of Patents, Washington, D. C."